US009851085B2

(12) United States Patent
Khubani et al.

(10) Patent No.: US 9,851,085 B2
(45) Date of Patent: *Dec. 26, 2017

(54) DECORATIVE LIGHTING APPARATUS HAVING TWO LASER LIGHT SOURCES

(71) Applicant: Telebrands Corp., Fairfield, NJ (US)

(72) Inventors: Ajit Khubani, Saddle River, NJ (US); Lou Lentine, Chattanooga, TN (US)

(73) Assignee: Telebrands Corp., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,433

(22) Filed: May 18, 2016

(65) Prior Publication Data
US 2017/0159924 A1    Jun. 8, 2017

Related U.S. Application Data

(63) Continuation-in-part of application No. 15/001,942, filed on Jan. 20, 2016, now Pat. No. 9,546,775, which
(Continued)

(51) Int. Cl.
*F21V 33/00* (2006.01)
*F21V 29/503* (2015.01)
(Continued)

(52) U.S. Cl.
CPC ............ *F21V 29/503* (2015.01); *F21V 14/00* (2013.01); *F21V 17/02* (2013.01);
(Continued)

(58) Field of Classification Search
CPC .... F21V 29/503; F21V 23/04; F21V 21/0824; F21V 21/30; F21V 21/15; F21V 29/70;
(Continued)

(56) References Cited

U.S. PATENT DOCUMENTS

| 1,196,951 A | 9/1916 | Hawthorne |
| D56,256 S | 9/1920 | Ryder |

(Continued)

FOREIGN PATENT DOCUMENTS

| CN | 201173996 | 12/2008 |
| CN | 202691883 | 1/2013 |

(Continued)

OTHER PUBLICATIONS

SeresRoad Outdoor Waterproof Star Projector, Landscape Projector, available at www.amazon.com, accessed on Nov. 13, 2015.
(Continued)

*Primary Examiner* — Elmito Breval
*Assistant Examiner* — Hana Featherly
(74) *Attorney, Agent, or Firm* — Cooper & Dunham, LLP

(57) ABSTRACT

A decorative lighting apparatus including first laser light source providing a first light and a second laser light providing a second light, a switch, and a motion assembly. The switch including a first setting corresponding to the first light source being in an on condition and the second light source being in an off condition, and a second setting corresponding to the first light source and the second light source being in an on condition. The motion assembly being configured to secure at least one optical element in the path of the first light or second light being generated by the first and second laser light sources, and including a motor being coupled to the articulating element such that a movement generated by the motor is imparted to the optical element.

23 Claims, 11 Drawing Sheets

Related U.S. Application Data is a continuation-in-part of application No. 14/976,202, filed on Dec. 21, 2015, now Pat. No. 9,458,994, which is a continuation-in-part of application No. 14/958,657, filed on Dec. 3, 2015, now abandoned, and a continuation-in-part of application No. 14/958,667, filed on Dec. 3, 2015, now Pat. No. 9,562,673.

(51) Int. Cl.

| | | |
|---|---|---|
| *F21V 23/04* | (2006.01) | |
| *F21V 21/08* | (2006.01) | |
| *F21V 21/30* | (2006.01) | |
| *F21V 21/15* | (2006.01) | |
| *F21V 29/70* | (2015.01) | |
| *F21V 23/06* | (2006.01) | |
| *F21V 31/00* | (2006.01) | |
| *F21V 14/00* | (2006.01) | |
| *F21V 17/02* | (2006.01) | |
| *F21W 121/00* | (2006.01) | |
| *F21W 131/107* | (2006.01) | |
| *F21Y 101/00* | (2016.01) | |
| *F21Y 115/10* | (2016.01) | |

(52) U.S. Cl.
CPC .......... *F21V 21/0824* (2013.01); *F21V 21/15* (2013.01); *F21V 21/30* (2013.01); *F21V 23/04* (2013.01); *F21V 23/0464* (2013.01); *F21V 23/0471* (2013.01); *F21V 23/06* (2013.01); *F21V 29/70* (2015.01); *F21V 31/00* (2013.01); *F21V 33/0056* (2013.01); *F21W 2121/00* (2013.01); *F21W 2131/107* (2013.01); *F21Y 2101/00* (2013.01); *F21Y 2115/10* (2016.08)

(58) Field of Classification Search
CPC ...... F21V 23/06; F21V 31/00; F21V 33/0056; F21V 23/0471; F21V 14/00; F21V 17/02; F21V 23/0464; F21W 2121/00; F21W 2131/107; F21Y 2101/00; F21Y 2115/10
USPC ........................................................ 362/234
See application file for complete search history.

(56) References Cited

U.S. PATENT DOCUMENTS

| | | |
|---|---|---|
| D56,257 S | 9/1920 | Ryder |
| D56,258 S | 9/1920 | Ryder |
| D58,676 S | 8/1921 | Macneale |
| D70,236 S | 5/1926 | Meden |
| D173,139 S | 10/1954 | Black |
| 3,104,064 A | 9/1963 | Bellek |
| 3,442,572 A | 5/1969 | Illsley |
| D231,559 S | 4/1974 | Darling |
| 3,822,930 A | 7/1974 | Douklias |
| D233,778 S | 11/1974 | Kennedy |
| D233,779 S | 11/1974 | Kennedy |
| D234,710 S | 4/1975 | Beeren |
| 3,944,761 A | 3/1976 | Nicholl |
| 4,114,112 A | 9/1978 | Epstein |
| D254,154 S | 2/1980 | Young |
| 4,307,528 A | 12/1981 | Dewees |
| 4,458,124 A | 7/1984 | Kroth |
| D278,215 S | 4/1985 | Patterson |
| 4,557,055 A | 12/1985 | Arai |
| D282,104 S | 1/1986 | Taylor |
| D286,682 S | 11/1986 | Greenlee |
| 4,779,176 A | 10/1988 | Bornhorst |
| 4,814,961 A | 3/1989 | O'Brien |
| 5,036,447 A | 7/1991 | Taylor |
| D323,406 S | 1/1992 | Fisher |
| 5,086,379 A | 2/1992 | Denison |
| 5,090,789 A | 2/1992 | Crabtree |
| D326,162 S | 5/1992 | Price |
| D328,147 S | 7/1992 | Gecchelin |
| D333,526 S | 2/1993 | Taylor |
| D333,529 S | 2/1993 | Denison |
| 5,226,104 A | 7/1993 | Unterleitner |
| D340,305 S | 10/1993 | Hall |
| 5,280,417 A | 1/1994 | Hall |
| 5,367,349 A | 11/1994 | Zeiler |
| 5,398,180 A | 3/1995 | Lee |
| D361,149 S | 8/1995 | Wedell |
| 5,459,539 A | 10/1995 | Yamamoto |
| D365,169 S | 12/1995 | Fillipp |
| D370,070 S | 5/1996 | Kay |
| 5,613,799 A | 3/1997 | Guide |
| 5,626,418 A | 5/1997 | Angelis |
| 5,649,760 A | 7/1997 | Beadle |
| D383,236 S | 9/1997 | Krogman |
| D389,935 S | 1/1998 | Pink |
| D397,490 S | 8/1998 | Lecluze |
| 5,824,981 A | 10/1998 | Suzuki |
| 5,882,107 A | 3/1999 | Bornhorst |
| D410,295 S | 5/1999 | Lueken |
| D413,996 S | 9/1999 | Andrus |
| D414,579 S | 9/1999 | Denison |
| 5,971,545 A | 10/1999 | Haitz |
| 6,000,813 A | 12/1999 | Krietzman |
| D427,696 S | 7/2000 | Scott |
| 6,145,228 A | 11/2000 | LaChance |
| 6,152,577 A | 11/2000 | Rizkin |
| D437,071 S | 1/2001 | Andrus |
| D437,652 S | 2/2001 | Uhler |
| D438,322 S | 2/2001 | Skradski |
| 6,190,025 B1 | 2/2001 | Solinsky |
| D438,999 S | 3/2001 | Bossy |
| 6,304,237 B1 | 10/2001 | Karakawa |
| 6,474,837 B1 | 11/2002 | Belliveau |
| 6,553,175 B2 | 4/2003 | Jaspan |
| D482,476 S | 11/2003 | Kwong |
| 6,655,817 B2 | 12/2003 | Devlin |
| 6,695,452 B2 | 2/2004 | Panasewicz |
| 6,722,771 B1 | 4/2004 | Stephens |
| 6,802,630 B2 | 10/2004 | Doppelt |
| 6,874,893 B2 | 4/2005 | Park |
| D506,282 S | 6/2005 | Benghozi |
| D506,283 S | 6/2005 | Benghozi |
| 7,040,780 B2 | 5/2006 | Diehl |
| 7,137,721 B1 | 11/2006 | Rao |
| D538,959 S | 3/2007 | Kosche |
| D541,456 S | 4/2007 | Kosche |
| D541,966 S | 5/2007 | Bhengozi |
| D542,959 S | 5/2007 | Yao |
| 7,257,551 B2 | 8/2007 | Oskorep |
| D550,877 S | 9/2007 | Mullen |
| D551,789 S | 9/2007 | Mullen |
| 7,369,584 B2 | 5/2008 | Goldman |
| 7,380,956 B2 | 6/2008 | Richmond |
| D574,104 S | 7/2008 | Sanoner |
| D574,532 S | 8/2008 | Lee |
| D577,453 S | 9/2008 | Metlen |
| D589,191 S | 3/2009 | Sabernig |
| 7,534,975 B1 | 5/2009 | Sharrah |
| D604,880 S | 11/2009 | Lovegrove |
| D604,882 S | 11/2009 | Mier-Langner |
| RE41,050 E | 12/2009 | Panasewicz |
| D605,325 S | 12/2009 | Sanoner |
| 7,641,345 B2 | 1/2010 | Johnson |
| D615,688 S | 5/2010 | Chen |
| D616,586 S | 5/2010 | Sabernig |
| D619,289 S | 7/2010 | You |
| D619,290 S | 7/2010 | You |
| D625,871 S | 10/2010 | Huang |
| D628,329 S | 11/2010 | Tuli |
| 7,832,918 B2 | 11/2010 | Chien |
| D632,414 S | 2/2011 | Croce |
| D638,159 S | 5/2011 | Yao |
| 8,003,886 B1 | 8/2011 | Rintz |
| D647,234 S | 10/2011 | Izardel |
| D647,657 S | 10/2011 | Janssen |
| D649,671 S | 11/2011 | Ferro |

(56) References Cited

U.S. PATENT DOCUMENTS

| | | | |
|---|---|---|---|
| 8,057,045 B2 | 11/2011 | Johnson | |
| D651,335 S | 12/2011 | Chen | |
| 8,100,537 B2 | 1/2012 | Johnson | |
| 8,100,538 B2 | 1/2012 | Kuroda | |
| D654,207 S | 2/2012 | Fletcher | |
| D654,214 S | 2/2012 | Huang | |
| D654,606 S | 2/2012 | Chen | |
| D656,821 S | 4/2012 | Marcoux | |
| D659,871 S | 5/2012 | Lee | |
| D667,981 S | 9/2012 | Connolly | |
| D667,989 S | 9/2012 | May | |
| 8,297,825 B2 | 10/2012 | Onishi | |
| 8,303,129 B1 | 11/2012 | Thielen | |
| 8,366,292 B2 | 2/2013 | McDermott | |
| 8,376,574 B2 | 2/2013 | Spartano | |
| 8,436,553 B2 | 5/2013 | Zampini | |
| 8,480,233 B2 | 7/2013 | Smith | |
| 8,485,686 B2 | 7/2013 | Swan | |
| 8,693,513 B2 | 4/2014 | Achtenhagen | |
| 8,721,160 B2 | 5/2014 | Chien | |
| 8,740,423 B1 * | 6/2014 | Jackson | F21V 33/00 362/253 |
| 8,901,827 B1 | 12/2014 | Xu | |
| D723,726 S | 3/2015 | Reed | |
| D738,023 S | 9/2015 | Rosello Gratacos | |
| D747,525 S | 1/2016 | Guercio | |
| D748,838 S | 2/2016 | Brynjolfsson | |
| D764,694 S | 8/2016 | Tsai | |
| D777,965 S | 1/2017 | Mirchandani | |
| D779,098 S | 2/2017 | Tsai | |
| 9,719,654 B2 | 8/2017 | Chien | |
| 2002/0101571 A1 | 8/2002 | Panazewicz | |
| 2003/0189825 A1 | 10/2003 | Tauch | |
| 2004/0042070 A1 | 3/2004 | Yagi | |
| 2004/0119951 A1 | 6/2004 | Vitantonio | |
| 2004/0141316 A1 * | 7/2004 | Twardawski | B62J 6/02 362/184 |
| 2005/0024863 A1 | 2/2005 | Phipps | |
| 2005/0243560 A1 | 11/2005 | Chen | |
| 2006/0158138 A1 | 7/2006 | Walter | |
| 2006/0198153 A1 | 9/2006 | Chien | |
| 2007/0064290 A1 | 3/2007 | Hochenbleicher | |
| 2008/0224849 A1 | 9/2008 | Sirhan | |
| 2008/0316732 A1 | 12/2008 | Blake | |
| 2009/0027900 A1 | 1/2009 | Janos | |
| 2009/0033814 A1 | 2/2009 | Khan | |
| 2009/0067191 A1 * | 3/2009 | Faber | F21V 29/004 362/580 |
| 2009/0122564 A1 | 5/2009 | Beadle | |
| 2009/0168026 A1 | 7/2009 | Chen | |
| 2009/0268121 A1 | 10/2009 | Hisada | |
| 2010/0046211 A1 | 2/2010 | Spartano | |
| 2010/0053969 A1 | 3/2010 | Weinheimer | |
| 2012/0176782 A1 * | 7/2012 | VanderSchuit | F21S 10/00 362/184 |
| 2012/0188754 A1 | 7/2012 | Fitzwater | |
| 2012/0324772 A1 | 12/2012 | Gingerella | |
| 2013/0088152 A1 | 4/2013 | Hagen | |
| 2013/0088723 A1 | 4/2013 | Feldkhun | |
| 2013/0257297 A1 | 10/2013 | Schmidt | |
| 2014/0036487 A1 | 2/2014 | Adams | |
| 2014/0268703 A1 | 9/2014 | Ehlert | |
| 2014/0328060 A1 | 11/2014 | Gadegaard | |
| 2015/0035437 A1 | 2/2015 | Panopoulos | |
| 2015/0159842 A1 | 6/2015 | Zhang | |
| 2015/0260385 A1 | 9/2015 | Brynjolfsson | |
| 2015/0308655 A1 | 10/2015 | Holmes | |
| 2016/0313089 A1 | 10/2016 | Collin | |
| 2016/0369996 A1 | 12/2016 | Qin | |
| 2017/0045212 A1 | 2/2017 | Ghasabi | |
| 2017/0080991 A1 | 3/2017 | White | |

FOREIGN PATENT DOCUMENTS

| | | |
|---|---|---|
| CN | 203273720 | 11/2013 |
| CN | 203431698 | 2/2014 |
| CN | 204141534 | 2/2015 |
| CN | 204176560 | 2/2015 |
| CN | 303234579 S | 6/2015 |
| CN | 104812342 | 7/2015 |
| CN | 204621354 | 9/2015 |
| CN | 204629169 U | 9/2015 |
| CN | 105068243 | 11/2015 |
| CN | 205155727 | 4/2016 |
| CN | 303657559 | 4/2016 |
| EP | 1 024 399 | 2/2000 |
| GB | 2435090 | 8/2007 |
| WO | WO 2006/074205 | 7/2006 |
| WO | WO 2010022367 | 2/2010 |
| WO | WO 2015/094009 | 6/2015 |
| WO | WO 2015/138480 | 9/2015 |
| WO | WO 2015/143450 | 9/2015 |
| WO | WO 2015/149877 | 10/2015 |

OTHER PUBLICATIONS

Us-vision AGO-20RG Modern Outdoor/ Indoor 20 Patterns Gobos Rg Laser Projector, available at www.amazon.com, accessed Nov. 13, 2015.
Sminiker Outdoor Laser Light Sparkle Magic Lights Landscape Light Holiday Light, available at www.amazon.com, accessed Nov. 13, 2015.
Us-vision Outdoor Holiday Waterproof Green Laser Lighting Show, available at www.amazon.com, accessed Nov. 13, 2015.
Improvements All-metal 4-in-1 Projection Light with Remote, available at www.amazon.com, accessed Nov. 13, 2015.
Klaren Color Laser Light Projector—Improvements, available at www.amazon.com, accessed Nov. 13, 2015.
Light Flurries, available at www.lightflurries.com, accessed Mar. 17, 2016.
Outdoor Indoor Spright Smart Firefly Light with Timer Green, available at www.amazon.com, accessed May 2, 2016.
Blisslights Spright Spring Smart Outdoor Indoor Firefly Light Projector with Timer, available at www.amazon.com, accessed May 2, 2016.
Mr. Christmas Super Green Laser Light Show, available at www.amazon.com, accessed May 2, 2016.
BlissLights Motion Laser, available at www.amazon.com, accessed May 2, 2016.
Color Laser Lights Instructions, published 2014.
BlissLights Spright Smart User Guide, published 2014.
Written Opinion of International Search Authority PCT/US2016/021354, published Jun. 30, 2016.
International Search Report PCT/US2016/021354, published Jun. 30, 2016.
International Search Report PCT/US2016/021347, published May 17, 2016.
Written Opinion of International Search Authority PCT/US2016/021347, published May 17, 2016.
International Search Report PCT/US2016/021338, published May 16, 2016.
Written Opinion of International Search Authority PCT/US2016/021338, published May 16, 2016.
Laser Light, available at www.amazon.com, accessed on Nov. 13, 2015.
Night Stars, available at www.amazon.com, accessed Nov. 13, 2015.
Poeland Garden Laser Landscape, available at www.amazon.com, accessed Nov. 13, 2015.
Remote Controllable RGB Laser, available at www.amazon.com, accessed Nov. 13, 2015.
Newest Garden Tree and Outdoor Wall Decoration Laser, available at www.amazon.com, accessed Nov. 13, 2015.
Pepnice Red and Green Firefly Laser Light, available at www.amazon.com, accessed Nov. 13, 2015.

(56) References Cited

OTHER PUBLICATIONS

Klaren Color Laser Light Projector, available at www.amazon.com, accessed Nov. 13, 2015.
Garden Tree and Outdoor Wall Decoration Laser Lights for Holiday Lighting, available at www.amazon.com, accessed Nov. 13, 2015.
Green and Red Light Garden Tree and Outdoor Wall Decoration Laser Lights, available at www.amazon.com, accessed Nov. 13, 2015.
Moving Red and Green 2 Color Laser Landscape Projector Light w/ Remote, available at www.amazon.com, accessed Nov. 13, 2015.
Examination Report of Application No. 2016101293 by IP Australia, dated Oct. 20, 2016.
Laser Christmas Lights & Outdoor Laser Lights, published Oct. 6, 2015, available at http://web.archive.org/web/20151006140058/http://www.laserchristmaslights.com.
Examination Report of Application No. 2016101295 by IP Australia, dated Oct. 20, 2016.
Examination Report of Application No. 2016101293 by IP Australia, dated Feb. 17, 2017.
Extended European Search Report of Application No. 16197894.5-1568 by European Patent Office, dated Feb. 17, 2017.
Office Action of Application No. 2,937,150 by Canadian Intellectual Property Office, dated Jan. 26, 2017.
Extended European Search Report of Application No. 16197893 by European Patent Office, dated Feb. 24, 2017.
Extended European Search Report of Application No. 16197896 by European Patent Office, dated Mar. 13, 2017.
Laser Projector Yard Stake Sell Sheet by YFC-BonEagle, Copyright 2011.
Consumer Electronics Show Flyer by Prime, Jan. 2014.
Laser Light Prime, https://www.youtube.com/watch?v=ygPEISRdaRo, accessed May 25, 2017, published Nov. 29, 2014.
Declaration of Stephen D. Fantone dated Jul. 3, 2017, submitted in support of response to Order to Show Cause (Civil Action No. 2:17-cv-02878).
Everstar Merchandising Product No. 88-506.
Extended European Search Report of Application No. 16197895 by European Patent Office, dated Apr. 28, 2017.
Peatross, Physics of Light and Optics, Mar. 22, 2017, pp. 288-295, 303.
Request for Ex Parte Reexamination of U.S. Pat. No. 9,546,775, submitted Jul. 13, 2017.
Office Action of Application No. 2,937,150 by Canadian Intellectual Property Office, dated Jun. 30, 2017.
Examination Report of Application No. 2017100480 by IP Australia, dated Jun. 8, 2017.
Office Action of Application No. 2,965,063 by Canadian Intellectual Property Office, dated Jun. 16, 2017.
Order Granting Ex Parte Reexamination of U.S. Pat. No. 9,546,775, dated Aug. 1, 2017.
Petition For Post Grant Review of U.S. Pat. No. 9,546,775, filed on Oct. 16, 2017.
Slate, "Know Your Fireworks," published Jul. 1, 2011 (Exhibit 1006 to the Petition For Post Grant Review of U.S. Pat. No. 9,546,775, filed on Oct. 16, 2017).
Webster's Disctionary, 2014, p. 1527, published by Houghton Mifflin Publishing Co. (Exhibit 1007 to the Petition For Post Grant Review of U.S. Pat. No. 9,546,775, filed on Oct. 16, 2017).
Chauvet, Ezmin User Manual, 2013 (Exhibit 1010 to the Petition For Post Grant Review of U.S. Pat. No. 9,546,775, filed on Oct. 16, 2017).
Thor Labs Drawing for Item No. NDC-100C-2M, drawn on Jun. 22, 2012 (Exhibit 1019 to the Petition For Post Grant Review of U.S. Pat. No. 9,546,775, filed on Oct. 16, 2017).
Evaluation Report of Utility Model Patent CN 2016208941741, mailed Aug. 3, 2017.

\* cited by examiner

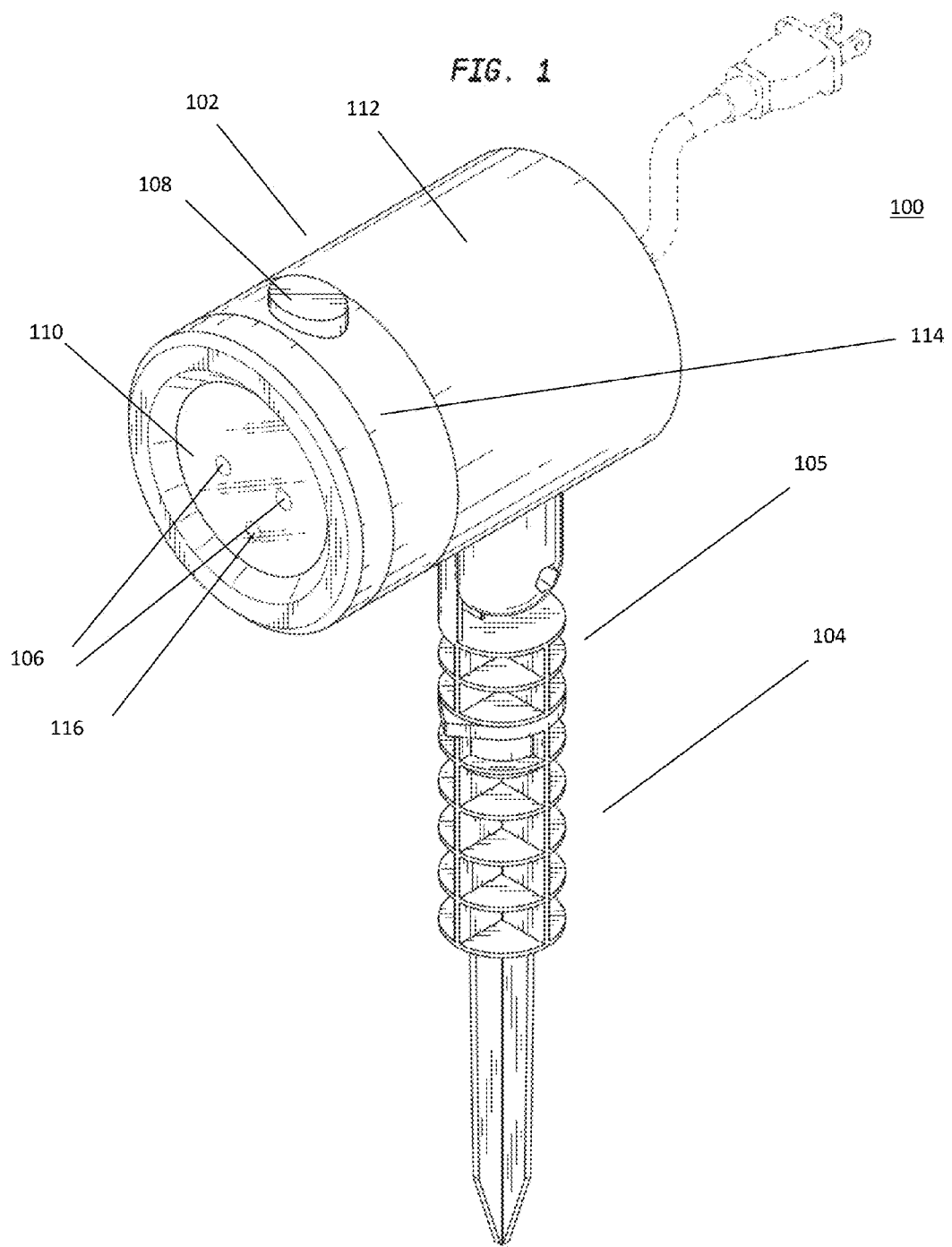

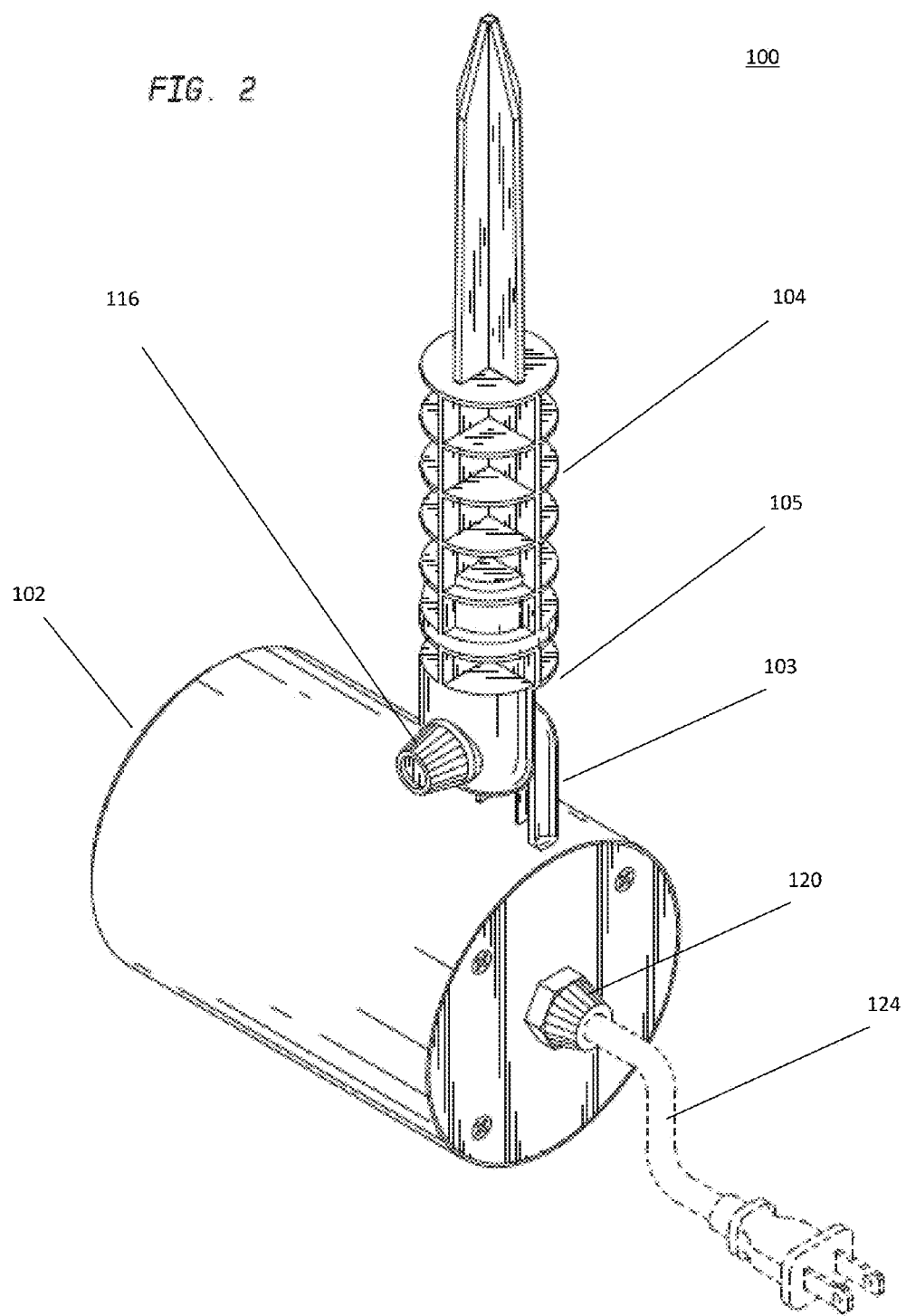

Dots Quantity: 800      690
Beam Angle: > 90°
Texture: Polymers
Area: 50mm X 50mm
Evenness: 90%

DECORATIVE LIGHTING APPARATUS HAVING TWO LASER LIGHT SOURCES

CROSS-REFERENCE TO PRIOR APPLICATIONS

This application is a continuation-in-part application of U.S. application Ser. No. 15/001,942, filed on Jan. 20, 2016, which is a continuation-in-part application of U.S. application Ser. No. 14/976,202, filed on Dec. 21, 2015, which is a continuation-in-part application of U.S. application Ser. No. 14/958,657, filed on Dec. 3, 2015 and U.S. application Ser. No. 14/958,667, filed on Dec. 3, 2015. All the applications are hereby incorporated by reference herein in their entireties.

FIELD

The present invention generally relates to a decorative lighting apparatus. Specifically, embodiments of the present invention relate to a decorative laser light apparatus.

BACKGROUND

Lighting is often used in a decorative manner. For example, many people decorate homes, offices, stores, outdoor spaces, etc. with various lighting to achieve certain effects, designs, atmospheres, festive moods, etc. Although decorative lighting may be used at any time of the year, many people utilize decorative lighting during certain holidays.

There are many types of decorative lighting. For example, string lights, character lights, and laser lights are just a few of the various forms of decorative lighting. However, existing laser lights having numerous shortcomings in their design and functionality. For example, switch mechanisms used to control the operation of many laser lights are typically limited in their functionality and are often disposed in inconvenient locations. This can make accessing the switch and operating the decorative light difficult, especially when the light is positioned for use. Additionally, although the lasers used in the decorative lights can be dangerous, many decorative laser lights use unreliable adhesives and tapes that a prone to failure to affix lenses that scatter the light emitted by lasers.

SUMMARY

Embodiments of the present invention can provide a decorative lighting apparatus for projecting light generated by light sources onto a target, such as an outside wall of a house or other structure, for use as a substitute for or alternative to holiday decorations. The apparatus can include a first and a second laser light source, a switch, and a motion assembly. The first laser light source can provide a light of a first color, the second laser light source can provide a light of a second color. The switch can include a first setting corresponding to the first light source being in an on condition and the second light source being in an off condition, and a second setting corresponding to the first light source and the second light source being in an on condition. The motion assembly can include an articulating element which is configured to secure at least one optical element in at least one of a first path of the first light being generated by the first laser light source and a second path of the second light being generated by the second laser light source and a motor. Additionally, the motor can be coupled to the articulating element such that a movement generated by the motor is imparted to the optical element so that at least one of the first light and the second light passing through the at least one optical element optical elements is articulated when projected onto a surface.

Embodiments of the present invention can include a body and a mounting element, such that the body is removably attached to the mounting element. Further, the mounting element can include at least one of a stake and a substantially planar mounting surface. Additionally, the mounting element can be removably attached to the body via at least one of threads, screw, nut, clip, or a bracket.

Embodiments of the present invention can include a heatsink for dissipating heat generated by the light source. Further, the heatsink can substantially surround each of the light sources. Additionally, the heatsink can include channels for routing wiring.

The decorative lighting apparatus can include a housing. Further, the housing can be sized and dimensioned to enable sufficient cooling of the light sources. Additionally, the housing can be constructed of plastic.

Embodiments of the present invention can include first light source and second light source that are angled, such that the first light and the second light overlap.

Embodiments of the present invention can include a substantially weather-proofed electrical socket. The socket can include a toric joint. Further, the toric joint can a first portion with a threaded surface and a second portion with a complimentary threaded surface such that the threaded surface of the first portion engages and couples with the threaded surface of the second portion.

Embodiments of the present invention can include overheating protection mechanism. The overheating protection mechanism can include a temperature sensor configured to control an operation of the decorative lighting apparatus when the apparatus reaches a predetermined threshold temperature so as to prevent overheating of the decorative lighting apparatus.

Embodiments of the present invention include a heating element configured to heat each of the light sources. Further, the heating element can include a resistor. Additionally, the heating element can include a temperature sensor configured to control an operation of the heating element when the apparatus reaches a predetermined threshold temperature so as to allow operation of the decorative lighting apparatus below the predetermined threshold temperature.

Embodiments of the present invention can include a speaker configured to produce audio signals. Yet another embodiment of the present invention can include a motion sensor configured to turn on the decorative lighting apparatus when the motion sensor detects a motion.

In another embodiment of the present invention, the first light source and second light source can be configured to pulsate.

The decorative lighting apparatus can include a pivoting arm wherein the pivoting arm provides relative rotational adjustment between the body and the base. Further, the pivoting arm can include a plurality of teeth to provide a plurality of discrete relative positions between the body and the base.

Embodiments of the present invention can include a power cord. Further, the power cord can be without a transformer.

BRIEF DESCRIPTION OF THE DRAWINGS

The features and advantages of the present invention can be more readily understood from the following detailed description with reference to the accompanying drawings, wherein:

FIG. 1 is a front perspective of an exemplary decorative lighting apparatus according to an embodiment of the present invention;

FIG. 2 is a rear perspective of an exemplary decorative lighting apparatus according to an embodiment of the present invention;

DETAILED DESCRIPTION

Figure 3A:
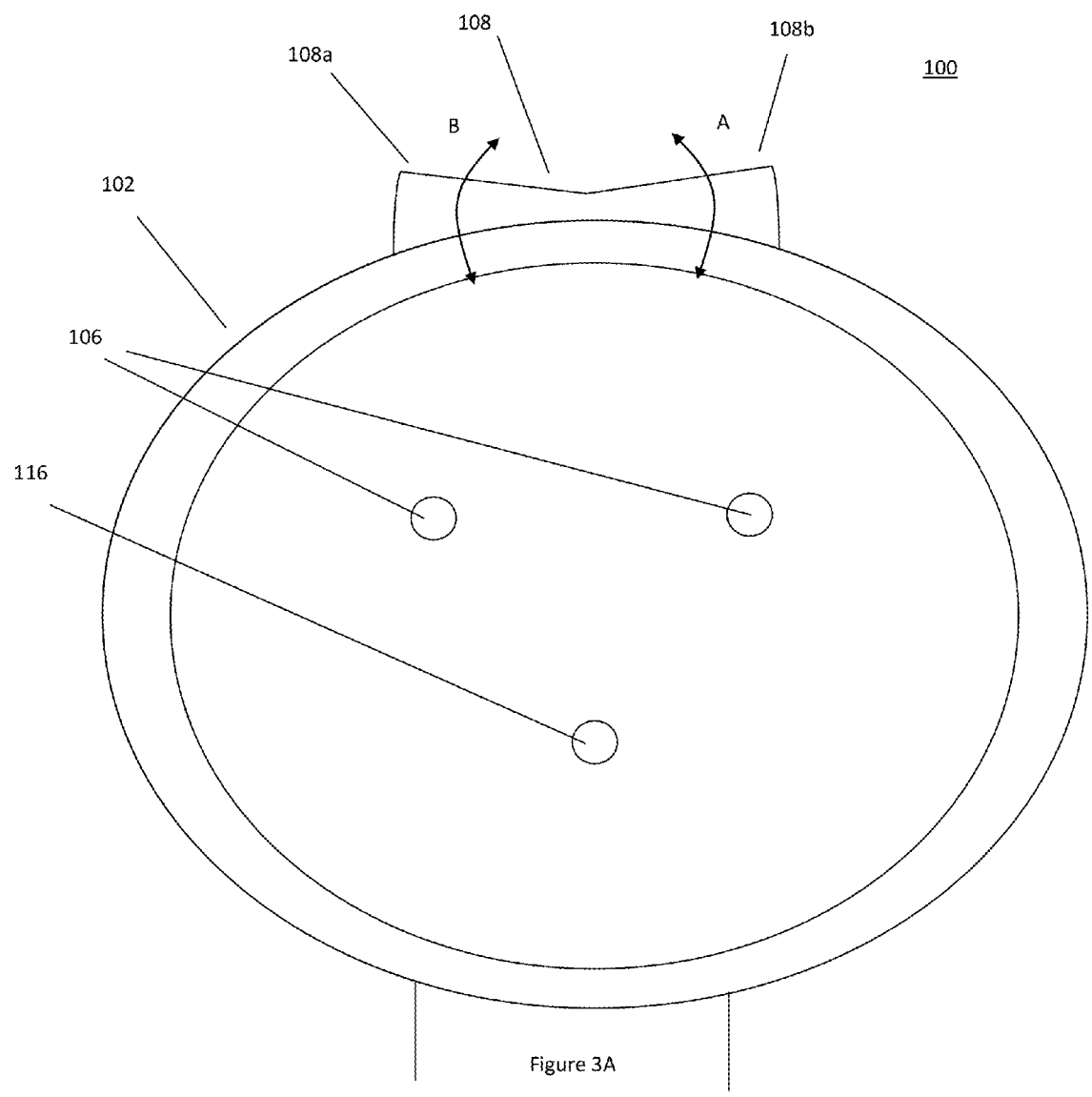
FIG. 3A is a front view of an exemplary decorative lighting apparatus according to an embodiment of the present invention.

Embodiments of the present invention generally relate to a decorative lighting apparatus. Specifically, certain exemplary embodiments of the present invention provide various new and novel features for a decorative lighting apparatus, such as a decorative laser lighting apparatus. Although the embodiments of the present invention are primarily described with respect to a decorative laser lighting apparatus, it is not limited thereto, and it should be noted that the exemplary apparatus and systems described herein may be used in connection with any decorative lighting apparatus.

In accordance with embodiments of the present invention, FIG. 1 shows a perspective view of an exemplary decorative lighting apparatus 100. As shown in FIG. 1, decorative lighting apparatus 100 may include body 102, mounting element 104, one or more light sources 106, switch 108, and light sensor 107. According to one embodiment, in operation, decorative lighting apparatus 100 is positioned via mounting element 104 and is coupled to a power source. A user can then actuate switch 108 to control the operation of decorative lighting apparatus 100. When decorative lighting apparatus 100 is turned on via switch 108, light sources 106 are activated to produce light, and decorative lighting apparatus 100 thereby emits and projects the light generated by light sources 106 onto a target, such as a wall of a house or other structure. According to certain embodiments of the present invention, the light generated by light sources 106 passes through a light attenuator to attenuate the light being emitted and projected by decorative lighting apparatus 100.

According to embodiments of the present invention, light sources 106 may be any type of light generation device. For example, light source(s) 106 may be a laser(s), light emitting diode(s), electric bulb(s), etc.

According to embodiments of the present invention, decorative lighting apparatus 100 can generate any combination of colored light depending on the light source(s) 106 employed by decorative lighting apparatus 100. For example, light source(s) 106 may include one or more light sources all producing the same color light (e.g., green) so that decorative lighting apparatus 100 only emits and projects one color light. Alternatively, light source(s) 106 may include multiple light sources capable of producing lights of various colors so that decorative lighting apparatus 100 can generate multiple different colored lights (e.g., red light and green light). Although the embodiments of the present invention are primarily described with respect to a decorative laser lighting apparatus generating two different colored lights (i.e., red light and green light), it is not limited thereto, and it should be noted that the exemplary apparatus and systems described herein may generate any combination of any number of different colored lights. Further, light sources 106 may be positioned in housing 112 such that the light being projected by the decorative lighting apparatus 100 are parallel to each other. Alternatively, light sources 106 maybe be positioned in housing 112 such that the light being projected by decorative lighting apparatus 100 are angled with respect to each other, and may be divergent from each other or convergent to each other. Accordingly, the various positioning of light source 106 can result, for example, in the light being divergent from each other so that the light spreads out and has maximizes coverage on the target surface, or alternatively, light source 106 can be positioned so that the lights overlap.

Figure 5A:
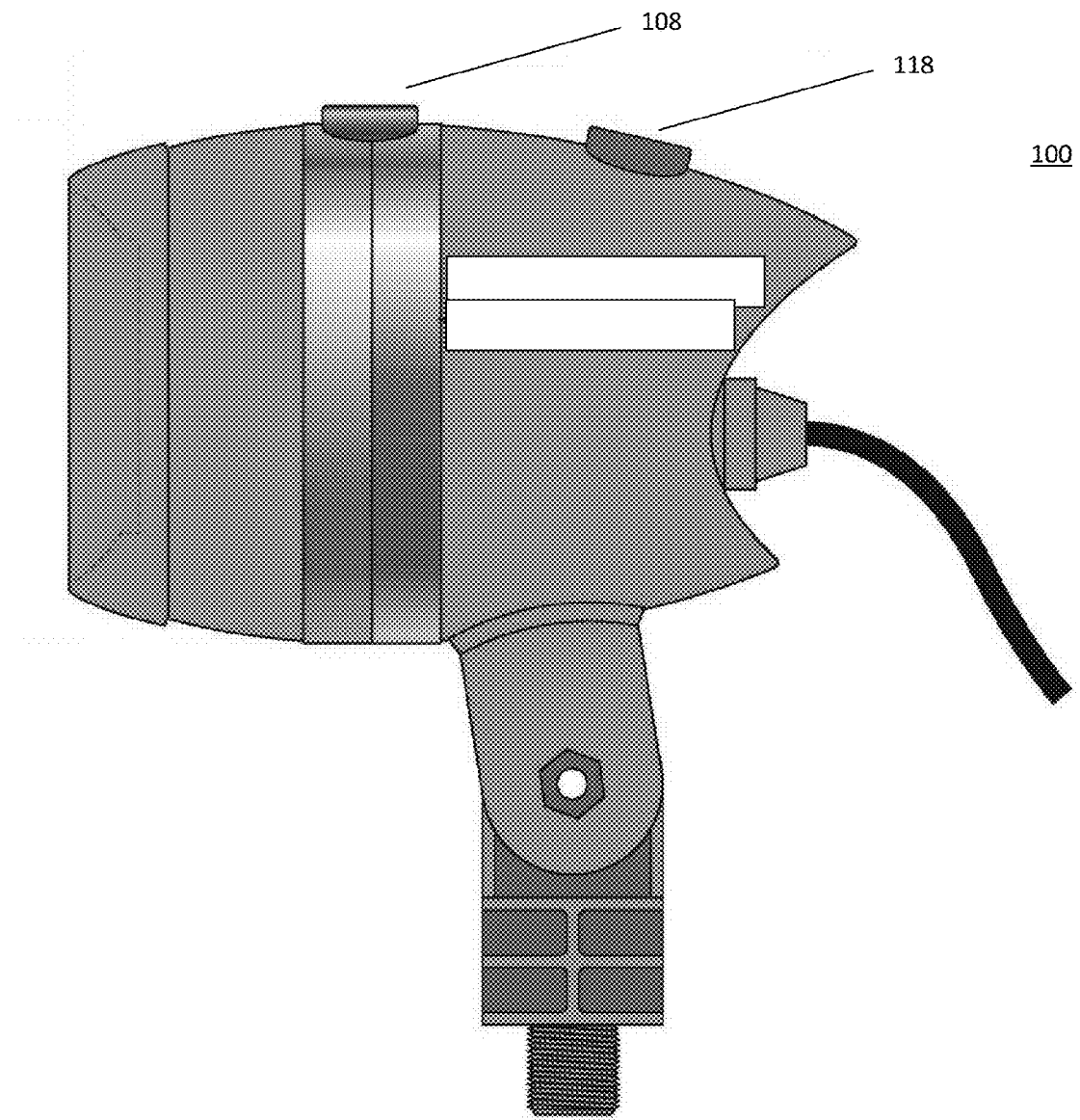
FIG. 5A is a side view of an exemplary decorative lighting apparatus according to an embodiment of the present invention.

As shown in FIG. 1, body 102 may be cylindrical in shape and preferably houses the mechanical and electrical components of decorative lighting apparatus 100. For example, body 102 may include housing 112, light source(s) 106, light cover 110, switch 108, switch visual indicator 114, and light sensor 107. Inside housing 112, body 102 may house electronic circuitry (not shown) that enables the electrical operation of decorative lighting apparatus 100, as well as various mechanical components (not shown) that facilitate the design and operation of decorative lighting apparatus 100. According to certain embodiments of the present invention, these components—electronic circuitry (not shown) that enables the electrical operation of decorative lighting apparatus 100, mechanical components (not shown) that facilitate the design and operation of decorative lighting apparatus 100—may be positioned substantially surrounding the light source(s) 106. According to certain embodiments of the present invention, as shown in FIG. 5A, decorative lighting apparatus 100 may also include a motion switch 118 to control a motion, modulation, or articulation of light source(s) 106. Additionally, decorative lighting apparatus 100 may include further switches that may control other features of decorative lighting apparatus 100, such as audio effects. For example, decorative lighting apparatus 100 may include a memory, an audio player, and a speaker. The memory may include audio stored (e.g., music, songs, sound effects, etc.) thereon, which may be played through the speaker. For example, holiday songs (e.g., Christmas music), or sound effects (e.g., jingling bells, Halloween sounds—ghost sound effects, witches cackles, etc.) may be stored on the memory and played via the speaker.

According to certain embodiments of the present invention, housing 112 may be sized and dimensioned to enable sufficient cooling of light source 106. For example, housing 112 may be sufficiently large to accommodate a sufficiently large heat sink to allow sufficient cooling of light sources 106, as well as any additional circuitry contained within decorative lighting apparatus 100. Further, housing 112 may be constructed of two or more pieces. For example, housing 112 may be constructed of two pieces, three pieces, or four pieces, etc. Further, the two or more pieces may be joined together using a toric joint or using rubber O-rings to prevent water and other environmental elements from penetrating within the interior of housing 112, thereby protecting switch 108 and the interior of housing 112 from water and other environmental elements. According to certain embodiments of the present invention, the housing 112 may be constructed of a variety of materials, including plastic or metal. For example, housing 112 may be constructed of a plastic material to prevent water and other environmental elements from damaging the exterior of the decorative lightning device 100. Additionally, plastic is cheaper to manufacture.

As shown in FIGS. 1 and 2, body 102 may be coupled to pivoting arm 105 via a coupling element 116. According to certain embodiments of the present invention, coupling element 116 may include a nut and a hand screw, as shown in FIG. 2. For example, projection 103 of body 102 may include a nut disposed within a recess which may prevent the nut from rotating, and pivoting arm 105 may include an opening through which the hand screw may pass. To secure pivoting arm 105 to body 102, the hand screw can pass through the opening in pivoting arm 105 and engage the nut disposed in projection 103 of body 102. Further, coupling element 116 may also allow body 102 to be rotatably adjusted relative to pivoting arm 105. For example, the surfaces of projection 103 and pivoting arm 105 which contact each other may be toothed or geared so that body 102 can be rotatably adjusted relative to pivoting arm 105 in discrete positions. Alternatively, the contacting surfaces can be smooth such that body 102 can be rotatably adjusted relative to pivoting arm 105 through a full range of motion. In operation, when the hand screw and the nut of coupling element 116 are not fully tightened, body 102 can be rotatably adjusted relative to pivoting arm 105 so that the angle at which the light is projected can be adjusted. After body 102 is positioned in a desired angle relative to pivoting arm 105, the hand screw of coupling element 116 can be tightened so that body 102 is substantially fixed relative to pivoting arm 105. Although coupling element 116 is shown as a screw and a nut, coupling element 116 can include any mechanism by which the angle of body 102 can be adjusted and fixed relative to pivoting arm 105, such as a hinge, or the like. According to certain embodiments of the present invention, body 102 is rotatably adjustable relative to pivoting arm 105 via a single pivoting point.

As shown in FIGS. 1 and 2, to facilitate positioning of decorative lighting apparatus 100 in a desired location and position, mounting element 104 is coupled to pivoting arm 105. According to certain embodiments, mounting element 104 and pivoting arm 105 can include complementary threads configured to engage each other to couple mounting element 104 and pivoting arm 105, allowing mounting element 104 and pivoting arm 105 to be screwed together. Alternatively, mounting element 104 and pivoting arm 105 can be coupled via any coupling engagement, such as a locking nut, an engaging projection and recess, etc. As shown in FIG. 1, according to certain embodiments of the present invention, mounting element 104 may include a ground stake. This can enable decorative lighting apparatus 100 to be positioned outside by positioning and securing decorative lighting apparatus 100 in a material such as soil, grass, dirt, etc. by inserting the mounting element 104 into such material. Although mounting element 104 is shown as a ground stake in FIG. 1, alternatively, mounting element 104 can be any mechanism that facilitates positioning decorative lighting apparatus 100. For example, mounting element 104 may include a bracket, a clip, a platform or base, or any other mechanism by which decorative lighting apparatus 100 may be located and/or positioned in a desired location.

Figure 7:
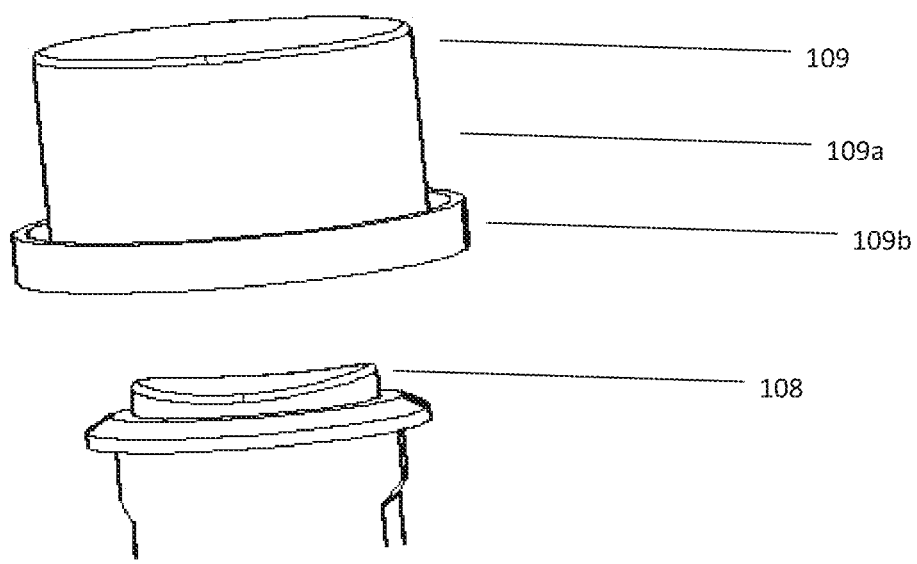
FIG. 7 is an exemplary weather-proofing element according to an embodiment of the present invention.

As noted above, the operation of decorative lighting apparatus 100 can be controlled using switch 108. Although switch 108 is shown as a button, switch 108 can be any type of switch that can control the operation of decorative lighting apparatus 100, such as, e.g., a rocker switch, a toggle switch, a dimmer switch, a rotating switch, and the like. Alternatively, switch 108 may be a push button switch with logic that permits sequentially activating numerous modes of operation of decorative lighting apparatus 100 with each press of the button. Preferably, switch 108 is disposed on a top portion of body 102 to facilitate easy access to the switch by a user. For example, if decorative lighting apparatus 100 is placed outdoors in a discreet location, such as behind bushes or some other structure, locating switch 108 on a top portion of body 102 enables a user to easily access switch 108 and operate decorative lighting apparatus 100. According to one embodiment, switch 108 may include weather-proofing elements to protect switch 108, as well as other internal components of decorative lighting apparatus 100, from the exterior environment, including weather. For example, weather-proofing elements for switch 108 may include rubber, plastic, and/or other sealing elements to make it substantially waterproof, water-repellant, dirt-proof, and the like. As shown in FIG. 7, according to one embodiment, waterproofing switch 108 may include a rubber or plastic cover 109 that can be disposed over switch 108. For example, switch 108 can be received within cover 109 to protect switch 108 from water and other environmental elements. Cover 109 may include a main body 109*a*, within which switch 108 may be received, and an extension 109*b*. Extension 109*b* may be sealed on an interior surface of housing 112 to prevent water and other environmental elements from penetrating within the interior of housing 112, thereby protecting switch 108 and the interior of housing 112 from water and other environmental elements.

Figure 3B:
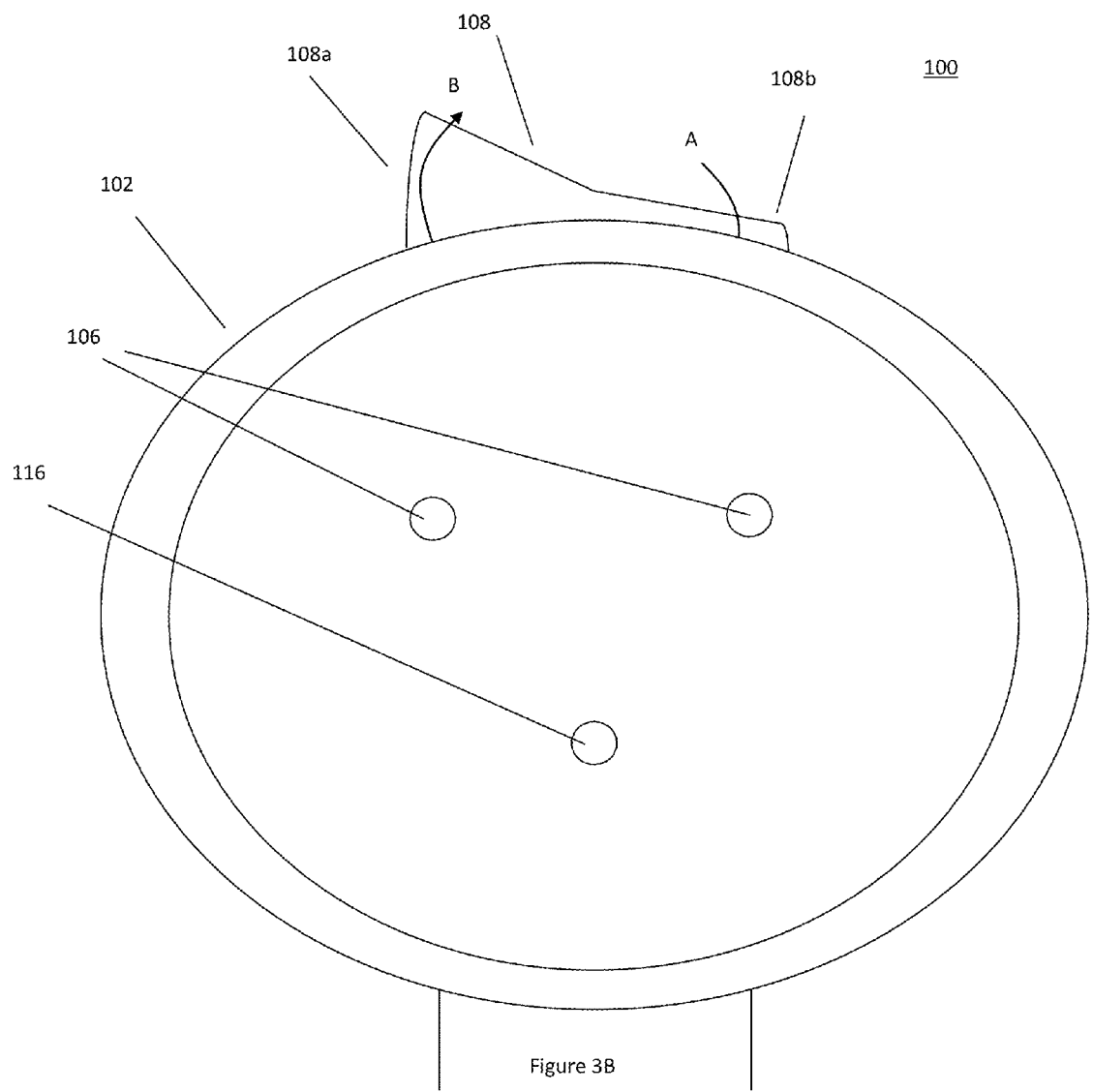
FIG. 3B is a front view of an exemplary decorative lighting apparatus according to an embodiment of the present invention.
Figure 3C:
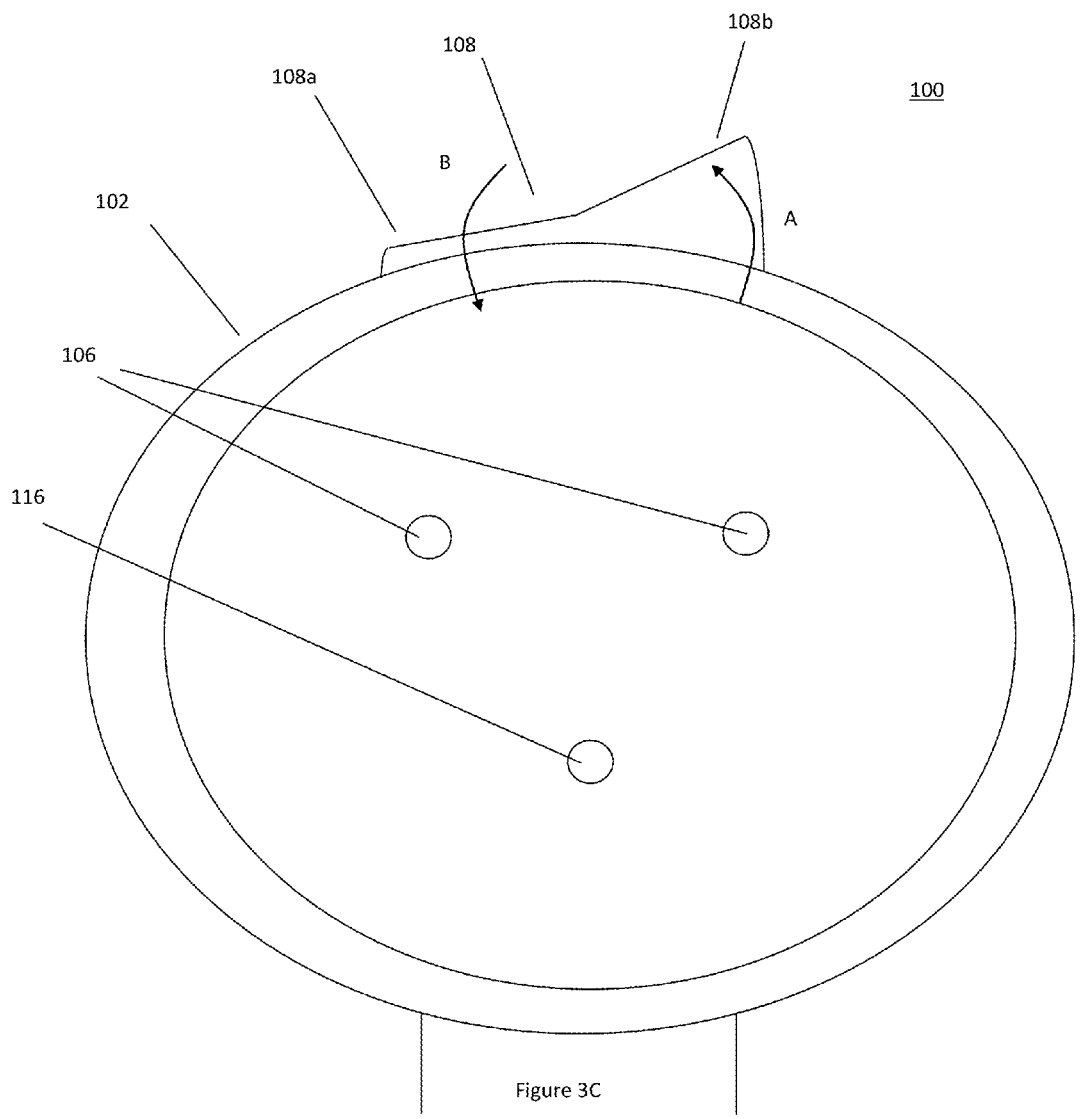
FIG. 3C is a front view of an exemplary decorative lighting apparatus according to an embodiment of the present invention.

As shown in FIG. 3A, according to certain embodiments of the present invention, switch 108 may include a rocker switch having switch portions 108*a* and 108*b*. As shown in FIGS. 3A, 3B, and 3C, switch 108 may include three positions and may be articulated between the various positions by pressing on switch portion 108*a* or 108*b* to articulate the switch in the directions depicted by arrows A and B.

According to certain embodiments of the present invention, FIG. 3A shows switch 108 in an OFF position. In this OFF position, neither switch portion 108*a* nor 108*b* is depressed, and light sources 106 are in an off condition (i.e., not generating light) and decorative lighting apparatus 100 is therefore not emitting or projecting any light. In the OFF position, either switch portion 108*a* or 108*b* can be pressed in the directions depicted by arrows A and B, respectively, to articulate switch 108 into one of two ON positions.

FIG. 3B shows switch 108 in a first ON position. In the position shown in FIG. 3B, switch 108 may have been articulated from the OFF position shown in FIG. 3A in the direction shown by the arrows. Specifically, the movement of switch portion 108*b* is shown by arrow A and the movement of switch portion 108*a* is shown by arrow B. For example, from the OFF position shown in FIG. 3A, switch portion 108b may have been pressed to articulate switch 108 from the OFF position to this first ON position as shown in FIG. 3B. According to certain embodiments of the present disclosure, in this first ON position, decorative lighting apparatus 100 may be operating in a first operating mode. For example, in an embodiment where light sources 106 produce red light and green light, this first ON position of switch 108 may correspond to an operation of decorative lighting apparatus 100 where light sources 106 producing both red light and green light are turned on so that decorative lighting apparatus 100 emits and projects both red light and green light.

FIG. 3C shows switch 108 in a second ON position. In the position shown in FIG. 3C, switch 108 may have been articulated from the OFF position in the direction shown by the arrows. Specifically, the movement of switch portion 108b is shown by arrow A and the movement of switch portion 108a is shown by arrow B. For example, from the OFF position shown in FIG. 3A, switch portion 108a may have been pressed to articulate switch 108 from the OFF position to this second ON position as shown in FIG. 3C. According to certain embodiments of the present disclosure, in this second ON position, decorative lighting apparatus 100 may be operating in a second operating mode. For example, in an embodiment where light sources 106 produce red light and green light, this second ON position of switch 108 may correspond to an operation of decorative lighting apparatus 100 where only the light sources 106 which only produce green light are turned on so that decorative lighting apparatus 100 emits and projects only green light.

Alternatively, where switch 108 is a push button switch with logic that facilitates sequentially activating numerous modes of operation of decorative lighting apparatus 100 with each press of the button, each of the operating modes described above can be a mode of operation that can be activated by a push of switch 108. For example, in an embodiment where light sources 106 produce red light and green light pushing switch 108 once may activate light sources 106 so that only one of the green or red light is produced. Pushing switch 108 a second time may activate light sources 106 so that the other one of the green or red light is produced. Pushing switch 108 a third time may activate light sources 106 so that both the green or red light is produced, etc.

Figure 4:
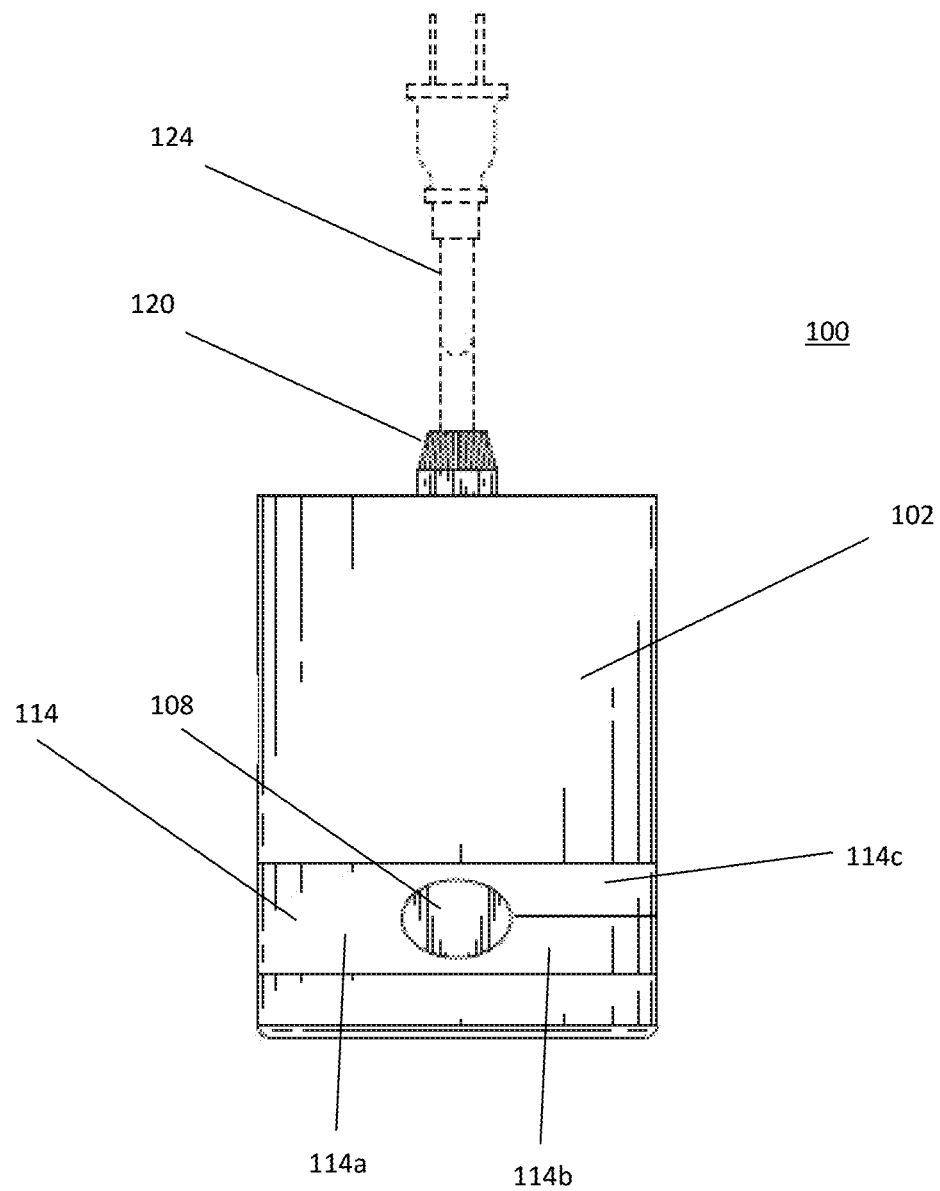
FIG. 4 is a top view of an exemplary decorative lighting apparatus according to an embodiment of the present invention.

FIG. 4 shows a top view of decorative lighting apparatus 100, including a view of body 102, switch 108, and switch visual indicator 114. As shown in FIG. 4, according to certain embodiments of the present invention, switch visual indicator 114 may include portions 114a, 114b, and 114c. Portions 114a, 114b, and 114c can include visual indicators that correlate the position of switch 108 to the operating modes of decorative lighting apparatus 100. For example, portion 114b may include a green color and portion 114c may include a red color. These colors may correspond to the first operating mode described with respect to FIG. 3B, where decorative lighting apparatus 100 emits and projects both green light and red light. Accordingly, articulating switch 108 toward the side of visual indicator 114 which includes green portion 114b and red portion 114c can activate the light sources 106 which produce green light and red light. Thus, articulating switch 108 in this direction would turn decorative lighting apparatus 100 on to emit and project both red light and green light. Further, portion 114a may include only a green portion and may correspond to the second operating mode of decorative lighting apparatus 100 described above with respect to FIG. 3C. Similarly, articulating switch 108 towards the side of visual indicator 114 which only includes green portion 114a can activate only the light sources 106 which produce green light, thereby activating decorative lighting apparatus 100 to emit and project only green light.

Light sensor 107 can also control the operation of decorative lighting apparatus 100 in conjunction with switch 108. According to certain embodiments of the present invention, light sensor 107 measures the ambient light present and can control whether light sources 106 are on or off. For example, assuming that switch 108 is in one of the two operating modes described above, light sensor may turn the appropriate light sources 106 on or off depending on the level of ambient light measured by light sensor 107. During the day, when light sensor 107 measures a level ambient light above a certain predetermined threshold, light sensor 107 may turn light sources 106 off, regardless of the position of switch 108. When the level of ambient light measured by light sensor 107 drops below the predetermined threshold (e.g., as it becomes night), light sensors 107 may allow light sources 106 to operate as dictated by switch 108. Accordingly, the operation of light sensor 107 can extend the lifetime of decorative lighting apparatus 100, prevent overheating of decorative lighting apparatus 100, and provide energy savings by ensuring that decorative lighting apparatus 100 is not operating continuously during high levels of ambient light when the light emitted and projected by decorative lighting apparatus 100 may be difficult to see in any event.

According to certain embodiments of the present invention, motion sensor (not shown) can also control the operation of decorative lighting apparatus 100 in conjunction with switch 108 and light sensor 107. Motion sensor may detect motion of an object (e.g., a person, vehicle, etc.) and can control whether light sources 106 are on or off. For example, decorative lighting apparatus 100 is in an ON condition (e.g., via switch 108), motion sensor may turn the appropriate light sources 106 on or off depending on whether motion is detected. When motion sensor does not detect any motion for a predetermined period of time, motion sensor may turn light sources 106 off, regardless of the position of switch 108. When motion sensor detects motion, motion sensor may allow light sources 106 to operate as dictated by switch 108 for a predetermined period of time, after which light sources 106 may be turned off. Accordingly, the operation of motion sensor can extend the lifetime of decorative lighting apparatus 100, prevent overheating of decorative lighting apparatus 100, and provide energy savings by ensuring that decorative lighting apparatus 100 is not operating continuously during times when it does not detect motion.

According to embodiments of the present invention, body 102 may house additional electronic circuitry (not shown) for overheating protection. For example, the overheating protection can be configured to automatically shut off the decorative lighting apparatus 100 if the ambient temperature of the decorative lighting apparatus 100 rises above a certain predetermined threshold so as to prevent overheating of the decorative lighting apparatus 100. Further, overheating protection apparatus may include a temperature sensor configured to control an operation of the decorative lighting apparatus 100 when the apparatus reaches a predetermined threshold temperature so as to prevent overheating of the decorative lighting apparatus 100. According to embodiments of the present invention, body 102 may house mechanical components to help dissipate heat generated by light sources 106. For example, these mechanical components may include heatsinks. Further, heatsinks may include plurality of metal fins. According to embodiments of the present invention, heatsinks may be disposed and configured to substantially surround light sources 106. For example, each light source 106 may be encased in a heatsink. Alternatively, a unitary heatsink may enclose all light sources 106. Further, heatsink may include channels to dispose wiring. For example, these channels may be use to route wiring from electronic circuitry (not shown) to light sources 106.

As shown in FIG. 5A, according to certain embodiments of the present invention, decorative lighting apparatus 100 may also include a motion switch 118. Similar to switch 108, motion switch 118 may also be disposed on a top portion of body 102 to enable a user to easily access switch 118, especially while decorative lighting apparatus 100 is positioned in use where access to other portions of decorative lighting apparatus 100 may be hindered or difficult. Motion switch 118 may also optionally include weather-proofing elements to protect motion switch 118, as well as other internal components of decorative lighting apparatus 100, from the exterior environment, including weather. For example, weather-proofing elements for motion switch 118 may include rubber, plastic, and/or other sealing elements to make it substantially waterproof, dirt-proof, and the like.

As noted above, motion switch 118 may control any visual and/or optical effect that can be produced by decorative lighting apparatus 100, such as a motion, modulation, or articulation of the light produced by light source(s) 106. For example, motion switch 118 may turn on and off the various visual and/or optical effects produced by decorative lighting apparatus 100, such as pulsing light sources 106, activating the colored lights being produced by light sources 106 in a pattern (e.g., first red, then green, then red, then together, etc.), moving the light being emitted and projected by decorative lighting apparatus 100. Moving the light being emitted and projected by decorative lighting apparatus 100 may be achieved by moving a reflective element within decorative lighting apparatus 100 so that the light projected by decorative lighting apparatus 100 on a target surface moves. Alternatively, in an embodiment where switch 108 includes a push button switch with logic, the visual and/or optical effects described above may be controlled via switch 108. For example, subsequent pushes of switch 108 may control whether the visual and/or optical effects are activated.

Figure 5B:
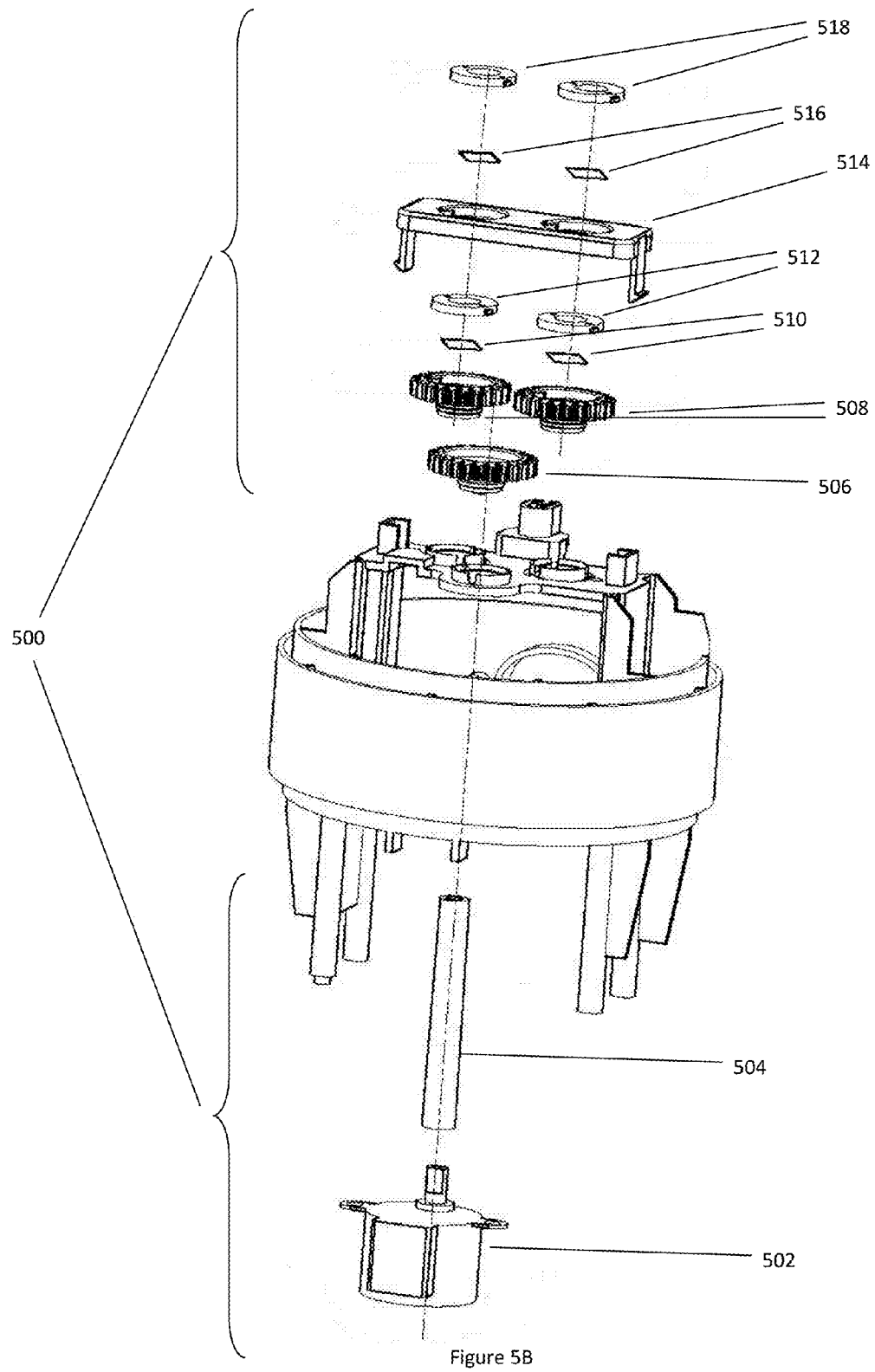
FIG. 5B is an exploded view of an exemplary motion assembly according to an embodiment of the present invention.

FIG. 5B shows an exploded view of motion assembly 500 according to an embodiment of the present invention. According to an embodiment, motion assembly 500 may enable the movement, modulation, and/or articulation of the light which is controlled by motion switch 118. As shown in FIG. 5B, according to an embodiment of the present invention, motion assembly 500 may include a motor 502, a connecting shaft 504, gears 506 and 508, articulating optical elements 510, articulating covers 512, a fixed optical elements seat 514, fixed optical elements 516, and fixed covers 518. Articulating optical elements 510 and/or fixed optical elements 516 may include attenuators as described herein and may be disposed in gears 508 or fixed optical elements seat 514 and secured via articulating covers 512 or fixed covers 512. Motion assembly 500 may include an articulating optical element 510 and a fixed optical element 516 for each light source 106 and may include any type of optical component, such as a lens, a diffracting element, an attenuator, etc., and may be disposed within a recess of gears 508 and fixed optical elements seat 514 and secured via articulating covers 512 and fixed covers 518, respectively. Motion switch 118 may control activation of motor 502. Once activated, motor 502 may drive gear 506. For example, motor 502 may provide a rotating or oscillating motion which may be transferred via a linkage, such as connecting shaft 504, to gear 506. The rotating or oscillating motion provided by motor 502 may rotate or oscillate gear 506, which may in turn rotate or oscillate gears 508. As shown in FIG. 5B, articulating optical elements 510 may be secured within recesses of gears 508. Alternatively, articulating optical elements 510 may be secured on a separate component which may be coupled to gears 506 and/or 508 and thereby articulated via the coupling mechanism to gears 506 and/or 508. Accordingly, optical elements 510 may then be rotated or oscillated in accordance with the rotating and/or oscillating motion of gears 508.

In operation, when light sources 106 can be turned on via switch 108, and the motion, movement, modulation, and/or articulation or the light is activated via motion switch 118. Once light sources 106 are turned on, the light generated by light sources 106 passes through articulating optical elements 510, which are driven by motor 502. Accordingly, as the light passes through articulating optical elements 510, the light is articulated, in accordance with the motion provided by motor 502, on the surface onto which decorative lighting apparatus 100 is projecting the light. For example, if the light is being projected on a wall, the articulation of the articulating optical elements 510 may cause the light to move across the surface of the wall.

Further, motion assembly 500 may be specifically designed to obtain a desired patterned or choreographed movement of the light across the surface. According to an embodiment, the design of articulating optical elements 510 and the motion generated by motor 502 may be specifically selected to obtain a desired pattern in which the light moves across the surface onto which it is being projected. According to an embodiment, motion assembly 500 may be configured such that the light that is projected from each light source 106 moves across the surface onto which it is being projected in a pattern similar to exploding fireworks. For example, motion assembly 500 may be designed such that the light comes together and then "explodes" into a large number of individual points of light on the surface onto which the light is being projected. Additionally, motion assembly 500 may be designed such that this pattern of exploding fireworks may be repeated. Motion assembly 500 may be configured such that the light moves across the surface onto which it is being projected in various other patterns. For example, the light may rotate in a circular manner, the light may oscillate linearly or rotationally about an axis, the light may spiral, etc. on the surface on which the light is being projected. Further, articulating optical elements 510 and/or fixed optical elements 516 may include optical features to scatter, or create other patterns in the light being projected (e.g., a star pattern, a character pattern—a snowman, Santa Claus, a reindeer, etc.).

Further, motion switch 118 may "freeze" any visual and/or optical effect that can be produced by decorative lighting apparatus 100, such as those discussed above. For example, activating the motion switch 118 once may turn on the various visual and/or optical effects produced by decorative lighting apparatus 100, such as pulsing light sources 106, activating the colored lights being produced by light sources 106 in a pattern (e.g., first red, then green, then red, then together, etc.), moving the light being emitted and projected by decorative lighting apparatus 100, "exploding" pattern, star pattern, or character patter. Activating the motion switch 118 a second time may freeze the motion, modulation, or articulation of the light produced by light source(s) 106. To unfreeze the various visual and/or optical effects frozen by the by the decorative lighting apparatus 100, the user may articulate the switch 108 to an OFF position.

Further, motion 118 may control audio effect that can be produced by decorative lighting apparatus 100, such as prerecorded sounds or music. For example, the decorative lighting apparatus 100 may include a speaker configured to produce audio signals, like sounds or music. The sounds or music may be produced in conjunction with the visual and/or optical effect being produced by the motion switch 118. For example, the sounds or music may be produced in synchrony with the visual and/or optical effects being produced by the motion switch 118. The audio effects may also be controlled via the motion sensor described herein.

Figure 6A:
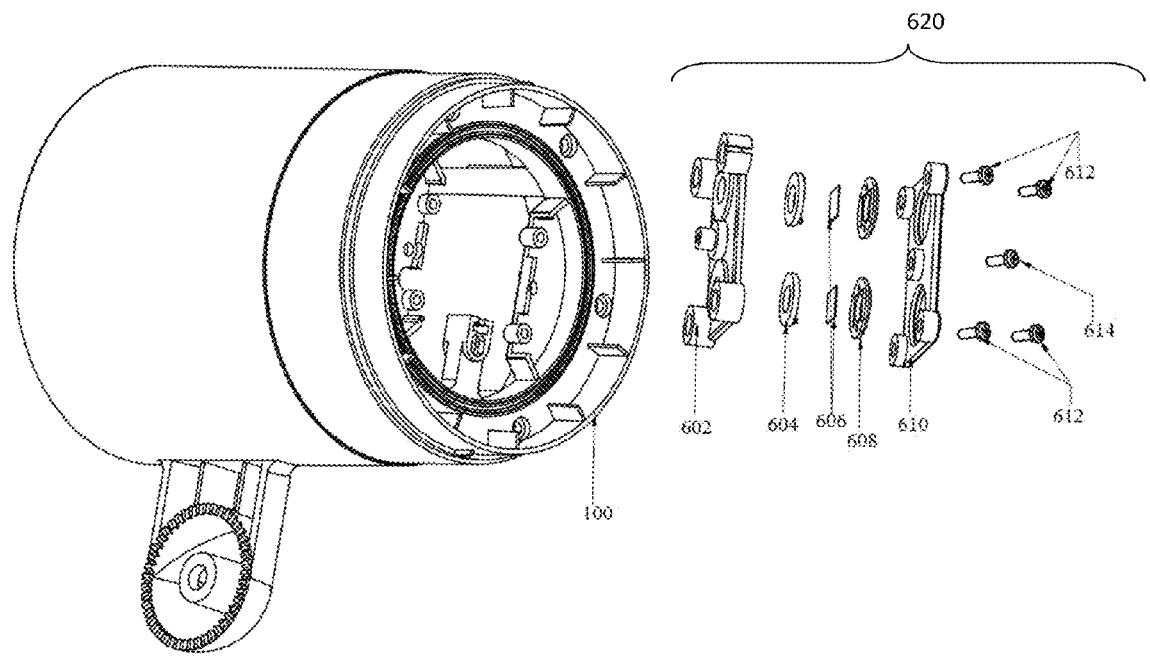
FIG. 6A is an exploded view of an exemplary attenuation assembly according to an embodiment of the present invention.

FIG. 6A shows an exploded view of attenuator assembly 620 of decorative lighting apparatus 100 according to certain embodiments of the present invention. Attenuator assembly 620 enables attenuator 606 to be positioned away from and not directly coupled to a front lens/glass/cover of decorative lighting assembly 100. This facilitates, for example, avoiding problems associated with attenuators that may be poorly affixed to a front glass, for example, with adhesives or glues that can become undone. As shown in FIG. 6A, attenuator assembly 620 includes attenuator lower housing 602, attenuator lower base 604, attenuators 606, attenuator upper base 608, attenuator upper housing 610, and fastening elements 612 and 614. Attenuator assembly 620 positions and secures attenuator 606 in the path of the light generated by light source 106 within body 102 of decorative lighting apparatus 100. According to some embodiments of the present invention, optical elements 510 and/or fixed optical elements 516 shown in FIG. 5B may include attenuator 606, and attenuator assembly 620 may be used in conjunction with motion assembly 500, as shown and described with respect to FIG. 5B. Although FIG. 6A shows decorative lighting apparatus 100 only having two attenuators 606, decorative lighting apparatus 100 preferably includes an attenuator 606 for each light source 106 included in decorative lighting apparatus 100. Thus, if decorative lighting apparatus 100 were to include five light sources 106, decorative lighting apparatus 100 would preferably include five attenuators 606. Accordingly, embodiments of the present invention contemplate modifications to attenuator assembly 620 shown in FIG. 6A to accommodate any number of attenuators 606 that may be required in view of the number of light sources 106 employed by decorative lighting apparatus 100.

Figure 6B:
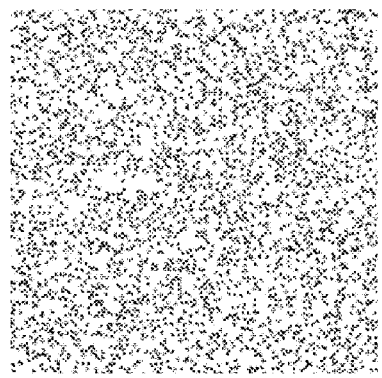
FIG. 6B is an exemplary attenuator scatter pattern according to an embodiment of the present invention.

According to certain embodiments of the present invention, attenuators 606 can include any type of attenuating device to be placed in the path of the light generated by light sources 106. For example, attenuator 606 can include an opening/slit or a lens to diffract and/or scatter the light produced by light source 106. Alternatively, attenuators can include an optical attenuator (e.g., fixed, variable, etc.) to reduce the power of the light produced by light sources 106. Attenuators may be necessary where light sources 106 include lasers since lasers can be dangerous and can cause damage to eyesight. Although attenuator 606 is shown to be substantially square, attenuator 606 may be any shape, such as a circle, rectangle, triangle, hexagon, octagon, or any other shape. FIG. 6B shows an exemplary scatter pattern 690 that may be employed by attenuator 606. Attenuator 606 is not limited to the scatter pattern 690 shown in FIG. 6B. Attenuator 606 may include any scattering or attenuating elements therein.

As shown in FIG. 6A, attenuator assembly 620 includes attenuator 606 disposed between upper and lower attenuator bases 604 and 608, which is disposed between upper and lower attenuator housings 602 and 610. Upper and lower attenuator bases 604 and 608 can include complementary designs and, when coupled together, preferably form a recess shaped and configured to receive attenuator 606 such that attenuator 606 is held in a substantially fixed position. Similarly, upper and lower attenuator housings 602 and 610 can include complementary designs and preferably include a recess, when coupled together, shaped and configured to receive the assembled upper and lower attenuator bases 604 and 608 such that the assembled upper and lower attenuator bases 604 and 608 are held in a substantially fixed position. The assembled attenuator assembly 620 can be held together and mounted within housing 112 by fastening devices 612 and 614. Although fastening devices 612 and 614 are shown as screws, fastening devices 612 and 614 may include any type of mechanism that can hold attenuator assembly 620 together and/or mount attenuator assembly 620 within housing 112 of body 102, such as snap-fits, adhesives, glue, screws, bolts, Velcro, hinges or any other fastening mechanisms. Accordingly, fastening devices 612 and 614 can secure attenuator assembly 620 together and position attenuator 606 in the path of the light generated by light sources 106.

According to certain embodiments of the present invention, decorative lighting apparatus 100 may include an anti-theft device. For example, decorative lighting apparatus 100 may include an anti-theft device that includes a proximity sensor disposed within decorative lighting apparatus 100 and a base unit that may be disposed in a secure location, such as inside a home. The anti-theft device may be configured that the proximity sensor disposed within decorative lighting apparatus 100 and the base unit must remain within a certain distance to each other for decorative lighting apparatus 100 to be operable. If the distance between the proximity sensor with decorative lighting apparatus 100 and the base unit exceeds a certain threshold distance (e.g., if decorative lighting apparatus 100 had been placed outside and is stolen and removed from the premises), anti-theft device preferably renders decorative lighting apparatus 100 inoperable. Alternatively or additionally, once the anti-theft device is activated, decorative lighting apparatus 100 may also include an audio and/or visual alerting mechanism, such as flashing lights, emitting a sound, etc. The anti-theft device may include other features, such as a key-pad to enable utilizing a security code, a biometric sensor, a motion sensor, etc. According to embodiments of the present invention, light sources 106 may be laser lights. Additionally, according to embodiments of the present invention, housing 112 may include additional mechanical or electrical heating components configured to heat the laser light sources 106 allowing them to emit light when the ambient temperature is below a certain predetermined threshold temperature. According to embodiments of the present invention, each laser light source 106 may its own heating element. Alternatively, one heating element may be configured to heat some or all of the laser light sources 106. According to embodiments of the present invention, the heating element may be a resistor. According to embodiments of the present invention, the heating element may include a temperature sensor configured to control an operation of the heating element when the decorative lighting apparatus 100 reaches a predetermined threshold temperature.

Figure 8:
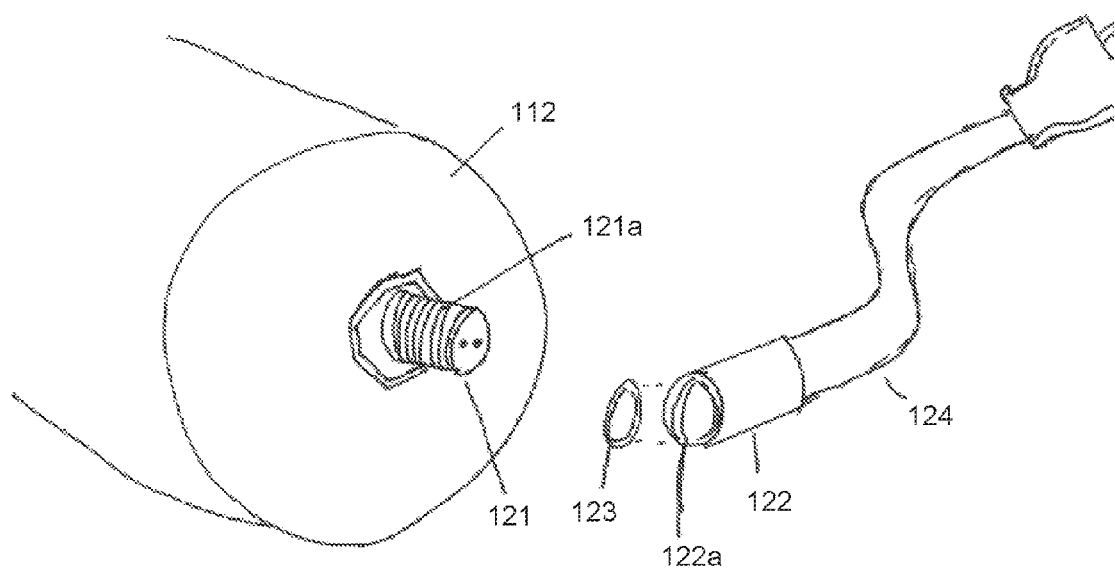
FIG. 8 is an exemplary view of an electric socket according to an embodiment of the present invention.

As noted above, decorative lighting apparatus 100 may be coupled to a power source, for example, A/C wall outlet or D/C battery. According to embodiments of the current invention, as shown in FIGS. 2 and 4, decorative lighting apparatus 100 may be coupled to an A/C power source via cord 124, which may be coupled to the housing 112 using electrical socket 120. Alternatively, cord 124 may be coupled to a second cord, and the second cord may be affixed to the housing. As shown in FIG. 8, electrical socket 120 may include a first portion 121, with at least two metal terminals, attached to housing 112 and a second portion 122, capable of engaging at least two metal terminals, attached to electric cord 124. First portion 121 may have include a threaded surface 121a corresponding to complementary threaded surface 122a on second portion 122, such that threaded surface 121a on first portion 121 engages with threaded surface 122a of second portion 122, enabling decorative lighting apparatus 100 to be connected/disconnected from cord 124. Alternatively, in an embodiment where cord 124 is coupled to a second cord, and the second cord may include second portion 122 and threaded surface 122a. As a result, only cord 124 need be UL certified. Additionally, cord 124 may not include a transformer. According on an embodiment, housing 112 may house a transformer (not shown). Furthermore, electrical socket 120 may be weather-proofed. For example, inner base of second portion 122 may additionally contain a rubber O-ring or toric joint 123 such that a hydrosonic seal may be formed when first portion 121 engages with second portion 122, thereby protecting electrical socket 120 from water and other environmental elements.

According to yet another embodiment of the present invention, decorative lighting apparatus 100 may include a solar power module configured to power decorative lighting apparatus 100. For example, decorative lighting apparatus 100 may include solar panels, such as photovoltaic panels, which can convert solar energy into electricity and store the electricity in a storage medium, such as batteries or capacitors, which can then be used to power decorative lighting apparatus 100. This can remove the need for decorative lighting apparatus 100 to be connected to an external power supply by, for example, having to run extension cords to the location of decorative lighting apparatus 100. Accordingly, this can enable decorative lighting apparatus 100 to be more easily placed and positioned in virtually any location.

The embodiments and examples shown above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of the disclosure. For a better understanding of the disclosure, reference should be had to the accompanying drawings and descriptive matter in which there is illustrated exemplary embodiments of the present invention.

What is claimed is:

1. A decorative lighting apparatus, comprising:
   a body adjustably attached to a mounting element, the body including:
      a first laser light source providing a first light having a first color;
      a second laser light source providing a second light having a second color,
      a switch including a first setting corresponding to the first light source being in an on condition and the second light source being in an off condition, and a second setting corresponding to the first light source and the second light source being in an on condition; and
   a motion assembly, the motion assembly including:
      an articulating element configured to secure at least one optical element in at least one of a first path of the first light being generated by the first laser light source and a second path of the second light being generated by the second laser light source; and
      a motor coupled to the articulating element such that a movement generated by the motor is imparted to the optical element so that at least one of the first light and the second light passing through the at least one optical element is articulated.

2. The apparatus of claim 1, wherein the mounting element includes at least one of a stake and a substantially planar mounting surface.

3. The apparatus of claim 2, wherein the mounting element is removably attached to the body via at least one of threads, screw, nut, clips, and bracket.

4. The decorative lighting apparatus of claim 1, further comprising a heatsink for dissipating heat generated by the light source.

5. The decorative lighting apparatus of claim 4, wherein the heatsink substantially surrounds each of the light sources.

6. The decorative lighting apparatus of claim 4 wherein heatsink includes channels for routing wiring.

7. The decorative lighting apparatus of claim 1 wherein the first light source and second light source are angled, such that the first light and the second light overlap.

8. The decorative lighting apparatus of claim 1 further comprising a housing, the housing being sized and dimensioned to enable sufficient cooling of the light sources.

9. The decorative lighting apparatus of claim 8, wherein the housing is constructed of plastic.

10. The decorative lighting apparatus of claim 1, further comprising a substantially weather-proofed electrical socket.

11. The decorative lighting apparatus of claim 10, wherein the socket includes a toric joint.

12. The decorative lighting apparatus of claim 11, wherein a first portion of the socket includes a threaded surface and a second portion includes a complimentary threaded surface such that the threaded surface of the first portion engages and couples with the threaded surface of the second portion.

13. The decorative lighting apparatus of claim 1, further comprising an overheating protection mechanism.

14. The decorative lighting apparatus of claim 13, wherein the overheating protection mechanism includes a temperature sensor configured to control an operation of the decorative lighting apparatus when the apparatus reaches a predetermined threshold temperature so as to prevent overheating of the decorative lighting apparatus.

15. The decorative lighting apparatus of claim 1 further comprising a heating element, the heating element configured to heat each of the light sources.

16. The decorative lighting apparatus of claim 15, wherein the heating element includes a resistor.

17. The decorative lighting apparatus of claim 16, wherein the heating element includes a temperature sensor configured to control an operation of the heating element when the apparatus reaches a predetermined threshold temperature so as to allow operation of the decorative lighting apparatus below the predetermined threshold temperature.

18. The decorative lighting apparatus of claim 1, further comprising a speaker configured to produce audio signals.

19. The decorative lighting apparatus of claim 1, further comprising a motion sensor, the motion sensor configured to turn on the decorative lighting apparatus when the motion sensor detects a motion.

20. The decorative lighting apparatus of claim 1, wherein the first light source and second light source are configured to pulsate.

21. The decorative lighting apparatus of claim 1, further comprising a pivoting arm wherein the pivoting arm provides relative rotational adjustment between the body and the base.

22. The decorative lighting apparatus of claim 21, wherein the pivoting arm includes a plurality of teeth to provide a plurality of discrete relative positions between the body and the base.

23. The decorative lighting apparatus of claim 1, further comprising a power cord, the power cord not having a transformer.

\* \* \* \* \*